United States Patent
Nishihara et al.

(10) Patent No.: US 6,506,839 B1
(45) Date of Patent: Jan. 14, 2003

(54) ELASTOMER COMPOSITION

(75) Inventors: Hajime Nishihara, Yokohama (JP); Shinichi Shibayama, Kawasaki (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/689,608

(22) Filed: Oct. 13, 2000

(51) Int. Cl.⁷ .................. C08L 23/00; C08L 23/08; C08F 8/00
(52) U.S. Cl. ............. 525/191; 525/192; 525/193; 525/194; 525/215; 525/221; 525/222; 525/232; 525/238; 525/240; 525/241
(58) Field of Search ................... 525/191, 192, 525/193, 194, 215, 221, 222, 232, 238, 240, 241

(56) References Cited

U.S. PATENT DOCUMENTS 5,037,888 A * 8/1991 Vanderbilt .................. 525/108
5,621,045 A * 4/1997 Patel et al. .................. 525/237
6,121,383 A * 9/2000 Abdou-Sabet et al. ...... 525/192

FOREIGN PATENT DOCUMENTS

| JP | A60231747 | 11/1985 |
| JP | A8120127 | 5/1996 |
| JP | A9104787 | 4/1997 |
| JP | A9137001 | 5/1997 |

* cited by examiner

Primary Examiner—Nathan M. Nutter
(74) Attorney, Agent, or Firm—Birch, Stewart, Kolasch & Birch, LLP (57) ABSTRACT

An elastomer composition obtained by crosslinking 1–99 parts by weight of a crosslinkable rubber-like polymer (A) and 1–99 parts by weight of a polypropylene resin (B) [the total amount of (A) and (B) being 100 parts by weight], where (B) is a crosslinking type polypropylene resin, has a flexural modulus of 100–10000 kgf/cm² as specified in JIS K6758 and has a melting point peak in the range of 100–150° C. in differential scanning calorimetry (DSC), the melting point peak calorie being in the range of 10–600 J/g, especially the above elastomer composition wherein (A) has a crosslinking degree of 1–95% and a swelling degree of 3–100.

8 Claims, 2 Drawing Sheets

ELASTOMER COMPOSITION

BACKGROUND OF THE INVENTION

The present invention relates to an elastomer composition. More particularly, it relates to an elastomer composition excellent in appearance, flexibility (feel), mechanical strength and melt processability.

There have already been known thermoplastic elastomer compositions obtained by so-called dynamic crosslinking. Namely crosslinking a rubber-like polymer such as a radical crosslinkable olefin elastomer and an olefin resin having no radical crosslinkability, such as PP, under melt-kneading them in an extruder in the presence of a radical initiator. These compositions are widely employed for uses such as automobile parts.

As these olefin elastomers, there have been known ethylene-propylene-diene rubbers (EPDM) or olefin elastomers produced using metallocene catalysts (JP-A-60-231747, JP-A-8-120127 and JP-A-9-137001). However, these compositions disclosed in the patent publications are not necessarily sufficient in appearance, flexibility (feel), mechanical strength and melt processability, and better elastomer compositions have been demanded.

SUMMARY OF THE INVENTION

Under the circumstances, the object of the present invention is to provide an elastomer composition free from the above-mentioned problems, namely, excellent in appearance, flexibility (feel), mechanical strength and melt processability.

As a result of intensive research conducted by the inventors for providing elastomer compositions excellent in appearance, flexibility (feel), mechanical strength and melt processability, surprisingly, it has been found that they are markedly improved in appearance, mechanical strength and melt processability with maintaining flexibility by adding a polypropylene resin having a specific structure to rubber-like polymers. Thus, the present invention has been accomplished.

That is, the present invention provides an elastomer composition obtained by crosslinking 1–99 parts by weight of a crosslinkable rubber-like polymer (A) and 1–99 parts by weight of a polypropylene resin (B) [the total amount of (A) and (B) being 100 parts by weight], wherein (B) is a crosslinking type polypropylene resin and has a flexural modulus of 100–10000 $kgf/cm^2$ measured in accordance with JIS K6758 and has a peak of melting point in the range of 100–150° C. in differential scanning calorimetry (DSC), the calorie in the peak of melting point being in the range of 10–600 J/g, and particularly provides the above composition in which (A) has a crosslinking degree of 1–95% and a swelling degree of 3–100.

DETAILED DESCRIPTION OF THE INVENTION

Figure 1:
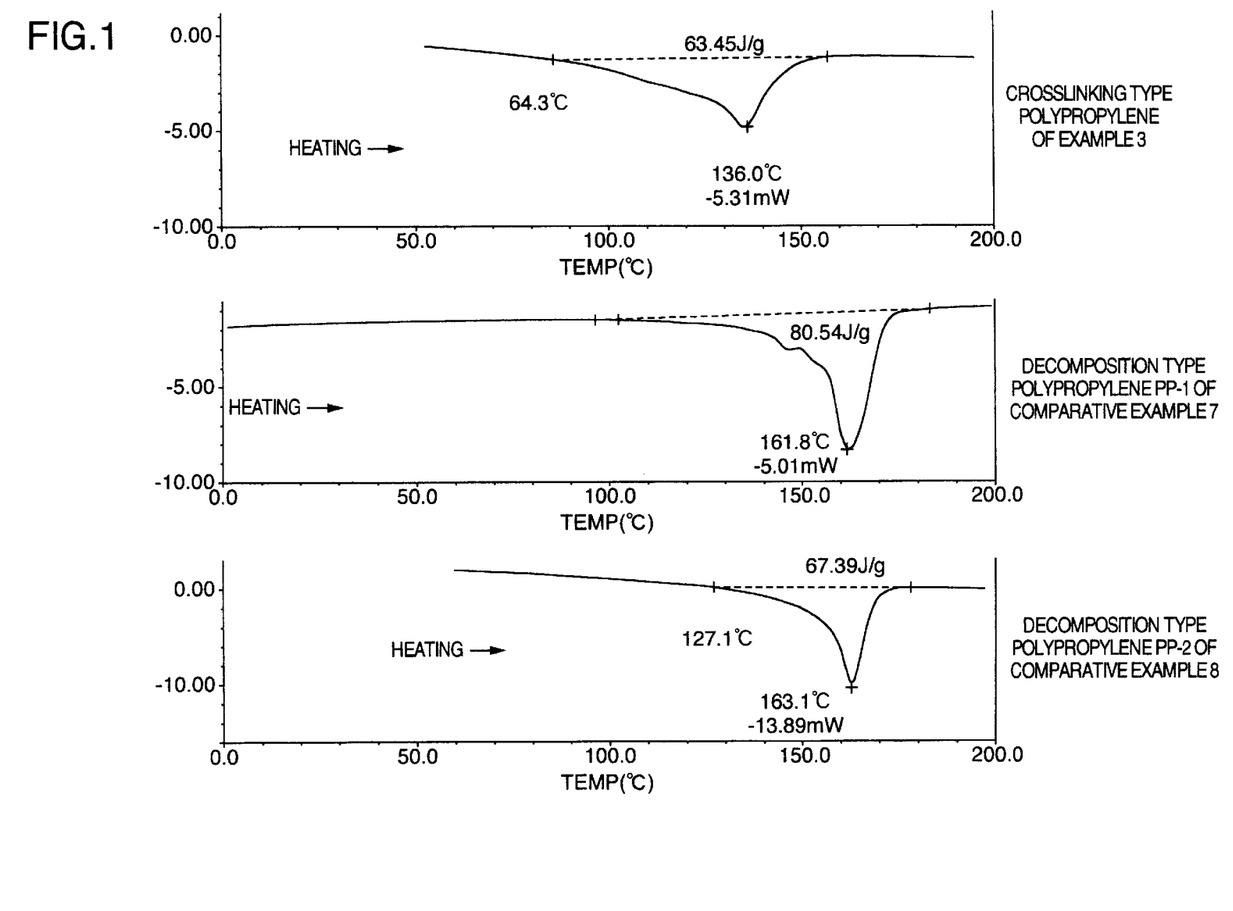
FIG. 1 is a graph which shows melting point and calories in the peaks of the melting points of the crosslinking type polypropylene of Example 3, the decomposition type polypropylene PP-1 of Comparative Example 7 and the decomposition type polypropylene PP-2 of Comparative Example 8 according to differential scanning calorimetry (DSC).
Figure 2:
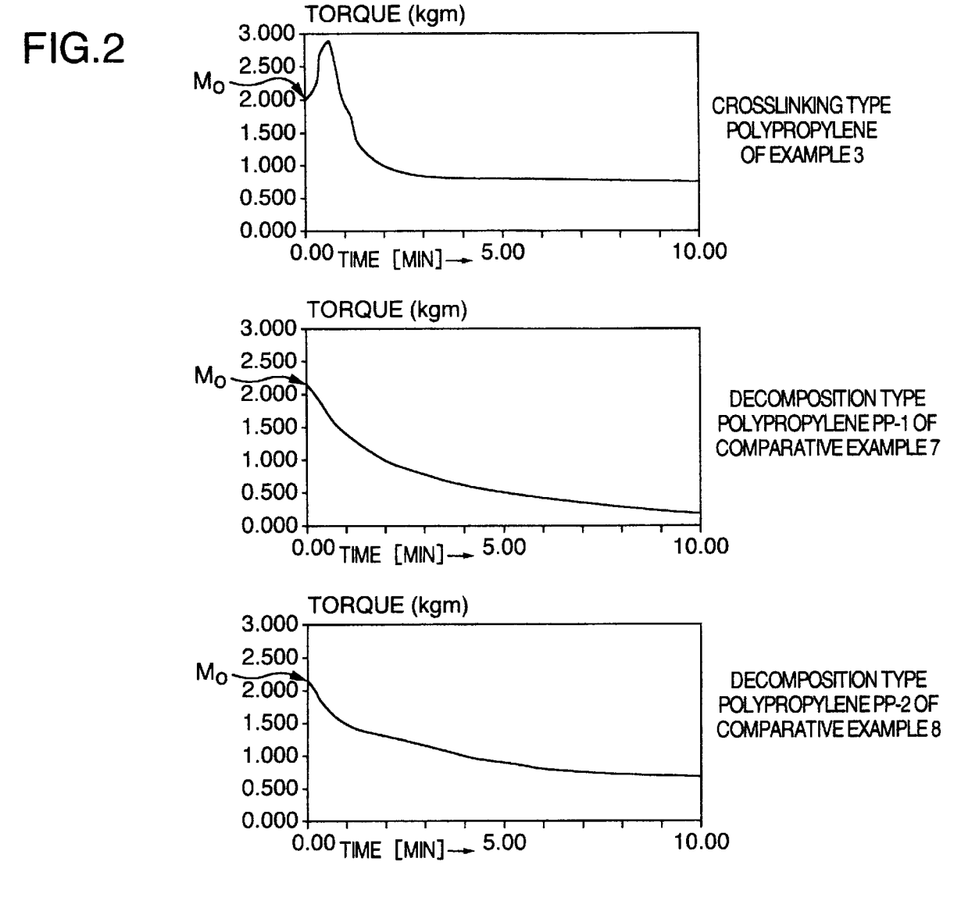
FIG. 2 is a graph which shows change in torque (kgm) of the crosslinking type polypropylene of Example 3, the decomposition type polypropylene PP-1 of Comparative Example 7 and the decomposition type polypropylene PP-2 of Comparative Example 8 in accordance with the judging method on crosslinking type or decomposition type of (B), using a laboplast mill.

The present invention will be explained in detail below.

The composition of the present invention is an elastomer composition obtained by crosslinking a crosslinkable rubber-like polymer (A) and a specific polypropylene resin (B).

In the elastomer composition, it is important that the flexural modulus of (B) as specified in JIS K6758 is 100–10000 $kgf/cm^2$ and a peak of melting point is present in the temperature range of 100–150° C. in the differential scanning calorimetry (DSC), and the calorie in the peak of melting point is in the range of 10–600 J/g. It has been found that when the above requirements are satisfied, excellent appearance, mechanical strength and melt processability are developed with maintaining flexibility.

Furthermore, it has been found that especially when the crosslinking degree of (A) is 1–95%, preferably 1–60% and the swelling degree of (A) is 3–100, preferably 10–100 adjusted by the selection of crosslinking conditions, markedly excellent melt processability can be developed. Thus, the present invention has been accomplished.

The present invention will be explained in detail on each component.

In the present invention, it is preferred that the crosslinkable rubber-like polymer (A) has a glass transition temperature (Tg) of not higher than −30° C., and examples of the crosslinkable rubber-like polymer (A) are crosslinked rubbers or uncrosslinked rubbers comprising diene rubbers such as polybutadiene, poly(styrene-butadiene) and poly(acrylonitrile-butadiene), saturated rubbers obtained by hydrogenating these diene rubbers, isoprene rubber, chloroprene rubber, acrylic rubbers such as polybutyl acrylate, ethylene-propylene copolymer rubber, ethylene-propylene-diene monomer terpolymer rubber (EPDM) and ethylene-octene copolymer rubber, and thermoplastic elastomers containing the above rubber components.

In the present invention, among the crosslinkable rubber polymers (A), ethylene-α olefin copolymers are especially preferred, and copolymers of ethylene and α-olefins of 3–20 carbon atoms are more preferred.

Examples of the α-olefins of 3–20 carbon atoms include propylene, butene-1, pentene-1, hexene-1,4-methylpentene-1, heptene-1, octene-1, nonene-1, decene-1, undecene-1, and dodecene-1. Among them, hexene-1,4-methylpentene-1 and octene-1 are preferred, and especially preferred are α-olefins of 6–12 carbon atoms and octene-1 is most preferred. Octene-1 has an excellent effect of providing flexibility even with addition in a small amount, and the resulting copolymers are excellent in mechanical strength.

The ethylene-α-olefin copolymers suitably usable in the present invention are preferably produced using known metallocene catalysts.

In general, a metallocene catalyst comprises a cyclopentadienyl derivative of a metal belonging to Group IV such as titanium or zirconium and a promoter, and not only has high activity as a polymerization catalyst, but also gives polymers that are narrower in molecular weight distribution and gives a more uniform distribution of α-olefin of 3–20 carbon atoms, which is a comonomer in the copolymers as compared with polymers obtained with Ziegler catalysts.

Copolymerization ratios of α-olefin in the ethylene-α-olefin copolymers used in the present invention is preferably 1–60% by weight, more preferably 10–50% by weight, most preferably 20–45% by weight. If the copolymerization ratio of α-olefin exceeds 60% by weight, hardness and tensile strength of the compositions considerably decrease. If the copolymerization ratio is less than 1% by weight, then flexibility and mechanical strength deteriorate.

Density of the ethylene-α-olefin copolymers is preferably in the range of 0.8–0.9 g/cm$^3$. By using olefin elastomers having a density in the above range, elastomer compositions excellent in flexibility and low in hardness can be obtained.

The ethylene-α-olefin copolymers used in the present invention preferably have a long-chain branch. Due to the presence of a long-chain branch, density of the copolymers can be made smaller as compared with the ratio (% by weight) of the copolymerized α-olefin without causing decrease of mechanical strength, and, thus, elastomers of low density, low hardness and high strength can be obtained. The olefin elastomers having a long-chain branch are disclosed in U.S. Pat. No. 5,278,272, etc.

Furthermore, the ethylene-α-olefin copolymers preferably have a peak of melting point according to DSC at a temperature not lower than room temperature. When the copolymers have a peak of melting point at a temperature not lower than room temperature, they are stable in their form and excellent in handleability and less in tackiness at a temperature in the range of not higher than the melting point.

Melt index of the crosslinkable rubber-like polymer (A) used in the present invention is preferably 0.01–100 g/10 min (under a load of 2.16 kg at 190° C.), more preferably 0.2–10 g/10 min. If the melt index exceeds 100 g/10 min, crosslinkability of the composition is insufficient, and if it is less than 0.01 g/10 min, fluidity is inferior and processability is deteriorated.

The crosslinkable rubber-like polymer (A) in the present invention may be used in admixture of a plurality of them. In this case, the processability can be further improved.

As one of preferred crosslinkable rubber-like polymers (A) in the present invention, there are thermoplastic elastomers, and, among them, polystyrene thermoplastic elastomers are especially preferred. As examples thereof, mention may be made of block copolymers comprising aromatic vinyl units and conjugated diene units or these block copolymers in which the conjugated diene unit portions are partially hydrogenated or epoxy-modified.

The aromatic vinyl monomers constituting the above block copolymers are, for example, styrene, α-methylstyrene, p-methylstyrene, p-chlorostyrene, p-bromostyrene and 2,4,5-tribromostyrene, and styrene is most preferred, and styrene as a main component may be copolymerized with other aromatic vinyl monomers mentioned above.

Examples of the conjugated diene monomers constituting the block copolymers are 1,3-butadiene and isoprene.

The preferred block structure of the block copolymers includes a linear block copolymer shown by SB, S(BS)$_n$ (n is an integer of 1–3) or S(BSB)$_n$ (n is an integer of 1–2) and a star block copolymer shown by (SB)$_n$X (n is an integer of 3–6 and X is a residue of a coupling agent such as silicon tetrachloride, tin tetrachloride or a polyepoxy compound) in which the B portion is a bonding center, with a proviso that the polymer block composed of the aromatic vinyl monomer unit is expressed by S and the polymer block composed of the conjugated diene unit and/or the conjugated diene unit which is partially hydrogenated is expressed by B. Among them, preferred are linear block copolymers of binary type of SB, ternary type of SBS and quaternary type of SBSB.

Another preferred hydrogenated copolymers of the crosslinkable rubber-like polymers (A) in the present invention are hydrogenated rubbers obtained by hydrogenating 50% or more of the total double bonds of unsaturated rubbers comprising a polymer and/or random copolymer having double bonds in main chains and side chains.

In the hydrogenated rubber, 50% or more, preferably 90% or more and more preferably 95% or more of the total double bonds are hydrogenated, and the remaining double bonds in the main chains are preferably 5% or less and the remaining double bonds in the side chains are preferably 5% or less. As examples of such rubbers, mention may be made of rubber-like polymers obtained by partial or complete hydrogenation of diene rubbers such as polybutadiene, poly(styrene-butadiene), poly(acrylonitrile-butadiene), polyisoprene and polychloroprene, and especially preferred are hydrogenated butadiene rubbers or hydrogenated isoprene rubbers.

These hydrogenated rubbers can be obtained by partial hydrogenation of the above-mentioned rubbers by known hydrogenation methods. For example,, mention may be made of a method of hydrogenation using a triisobutylborane catalyst as disclosed in F. L. Ramp, et al., *J. Amer. Chem. Soc.*, 83, 4672 (1961), a method of hydrogenation using toluenesulfonyl hydrazide as disclosed in Hung Yu Chen, J. Polym. Sci. Polym. Letter Ed., 15, 271 (1977), and a method of hydrogenation using an organocobalt-organoaluminum-based catalyst or an organonickel-organoaluminum-based catalyst as disclosed in JP-B-42-8704. Especially preferable methods are a method of hydrogenation using a catalyst capable of hydrogenation under gentle conditions of low temperatures and low pressures as disclosed in JP-A-59-133203 and JP-A-60-220147 and a method which comprises contacting the rubbers with hydrogen in an inert organic solvent in the presence of a catalyst comprising a bis(cyclopentadienyl) titanium compound and a hydrocarbon compound having sodium atom, potassium atom, rubidium atom or cesium atom as disclosed in JP-A-62207303.

Mooney viscosity (ML) of the hydrogenated rubbers measured at 100° C. is preferably in the range of 20–90, and viscosity of 5 wt % styrene solutions of the hydrogenated rubbers (5% SV) at 25° C. is preferably in the range of 20–300 centipoises (cps). Especially preferable range is 25–150 cps.

Control of the endothermic peak calorie which is an indication of crystallinity of the hydrogenated rubbers is carried out by the addition of a polar compound such as tetrahydrofuran or by the control of polymerization temperature. Reduction of the endothermic peak calorie can be attained by increasing the amount of the polar compound or lowering the polymerization temperature to increase 1,2-vinyl linkages.

The crosslinkable rubber-like polymer (A) in the present invention may be used in admixture of a plurality of them. In this case, the processability can be further improved.

The polypropylene resin (B) in the present invention is not limited as far as it satisfies the requirements of the present invention. Suitable are copolymer resins of propylene with an α-olefin of 2 or 4–20 carbon atoms, such as ethylene, butene-1, pentene-1 or hexene-1. Among them, especially preferred are random copolymer resins of propylene as a main component with α-olefins, for example, random copolymer resins of propylene as a main component with ethylene.

At least one resin selected from these resins is used in an amount of 1–99 parts by weight, preferably 5–90 parts by weight, more preferably 20–80 parts by weight. If it is less than 1 part by weight, fluidity and processability of the composition deteriorate and if it exceeds 99 parts by weight, flexibility of the composition is insufficient.

Melt index of the propylene resin (B) suitably usable in the present invention is preferably 0.1–100 g/10 min (under a load of 2.16 kg at 230° C.). If the melt index exceeds 100 g/10 min, heat resistance and mechanical strength of the elastomer composition are insufficient, and if it is less than 0.1 g/10 min, fluidity is inferior and molding processability is deteriorated.

The random copolymer resins of propylene as a main component with an (α-olefin which are most preferred in the polypropylene resins (B) can be produced by high pressure method, slurry method, vapor phase method, bulk method, solution method, etc., and Ziegler-Natta catalysts and single-site metallocene catalysts are preferred as polymerization catalysts. Particularly, when narrow compositional distribution and molecular weight distribution are required, random copolymerization method using the metallocene catalysts is preferred.

A specific production method of the random copolymer resins is disclosed in EP0969043A1 or U.S. Pat. No. 5,198,401 and is as follows. A liquid propylene is introduced into a reactor provided with a stirrer and then a catalyst is added to vapor phase or liquid phase through a nozzle. Then, ethylene gas or α-olefin is introduced into vapor phase or liquid phase in the reactor, and the reaction temperature and the reaction pressure are controlled to the conditions under which propylene is refluxed. The polymerization rate is controlled by the catalyst concentration and the reaction temperature, and the copolymerization composition is controlled by the amount of ethylene or α-olefin added.

The elastomer composition of the present invention is preferably obtained by crosslinking with a crosslinking agent (C). The crosslinking agent (C) contains a crosslinking initiator (C-1) as an essential component, and, if necessary, may contain a polyfunctional monomer (C-2) and a monofunctional monomer (C-3) as optional components.

The crosslinking agent (C) is used in an amount of 0.01–10 parts by weight, preferably 0.05–3 parts by weight based on 100 parts by weight of the composition comprising (A) and (B). If the amount is less than 0.01 part by weight, the crosslinking is insufficient and if it exceeds 10 parts by weight, appearance and mechanical strength of the composition are deteriorated.

The crosslinking initiators (C-1) include radical initiators such as organic peroxides and organic azo compounds. Typical examples thereof are peroxy ketals such as 1,1-bis(t-butylperoxy)-3,3,5-trimethylcyclohexane, 1,1-bis(t-hexylperoxy)-3,3,5-trimethylcyclohexane, 1,1-bis(t-hexylperoxy)cyclohexane, 1,1-bis(t-butylperoxy) cyclododecane, 1,1-bis(t-butylperoxy)cyclohexane, 2,2-bis(t-butylperoxy)octane, n-butyl-4,4-bis(t-butylperoxy)butane and n-butyl-4,4-bis(t-butylperoxy)-valerate; dialkyl peroxides such as di-t-butyl peroxide, dicumyl peroxide, t-butylcumyl peroxide, α,α'-bis(t-butylperoxy-m-isopropyl) benzene, α,α'-bis(t-butylperoxy)diisopropylbenzene, 2,5-dimethyl-2,5-bis(t-butylperoxy)hexane and 2,5-dimethyl-2, 5-bis(t-butylperoxy)hexyne-3; diacyl peroxides such as acetyl peroxide, isobutyryl peroxide, octanoyl peroxide, decanoyl peroxide, lauroyl peroxide, 3,5,5-trimethylhexanoyl peroxide, benzoyl peroxide, 2,4-dichlorobenzoyl peroxide and m-toluoyl peroxide; peroxy esters such as t-butylperoxy acetate, t-butylperoxy isobutyrate, t-butylperoxy-2-ethyl hexanoate, t-butylperoxy laurate, t-butylperoxy benzoate, di-t-butylperoxy isophthalate, 2,5-dimethyl-2,5-di(benzoylperoxy)hexane, t-butylperoxymaleic acid, t-butylperoxyisopropyl carbonate and cumylperoxy octenoate; and hydroperoxides such as t-butyl hydroperoxide, cumene hydroperoxide, diisopropylbenzene hydroperoxide, 2,5-dimethylhexane-2,5-dihydroperoxide and 1,1,3,3-tetramethylbutyl hydroperoxide.

Of these compounds, preferred are 1,1-bis(t-butylperoxy)-3,3,5-trimethylcyclohexane, di-t-butyl peroxide, dicumyl peroxide, 2,5-dimethyl-2,5-bis(t-butylperoxy)hexane and 2,5-dimethyl-2,5-bis(t-butylperoxy)hexyne-3.

The above (C-1) is used in an amount of preferably 1–80% by weight, more preferably 10–50% by weight in the crosslinking agent (C). If the amount is less than 1% by weight, crosslinking is insufficient and if it exceeds 80% by weight, mechanical strength lowers.

In the present invention, the polyfunctional monomer (C-2) preferably has a radical polymerizable functional group as a functional group, and the functional group is most preferably vinyl group. The number of the functional group is two or more, and it is especially effective to use (C-2) having three or more functional groups in combination with (C-3). Examples of the polyfunctional monomer are divinylbenzene, triallyl isocyanurate, triallyl cyanurate, diacetone diacrylamide, polyethylene glycol diacrylate, polyethylene glycol dimethacrylate, trimethylolpropane trimethacrylate, trimethylolpropane triacrylate, ethylene glycol dimethacrylate, triethylene glycol dimethacrylate, diethylene glycol dimethacrylate, diisopropenylbenzene, p-quinone dioxime, p,p'-dibenzoylquinone dioxime, phenylmaleimide, allyl methacrylate, N,N'-m-phenylenebismaleimide, diallyl phthalate, tetraallyloxyethane and 1,2-polybutadiene. Triallyl isocyanurate is especially preferred. These polyfunctional monomers (C-2) may also be used in combination of two or more.

The (C-2) is used in an amount of preferably 1–80% by weight, more preferably 10–50% by weight in the crosslinking agent (C). If the amount is less than 1% by weight, crosslinking is insufficient and if it exceeds 80% by weight, mechanical strength lowers.

The above-mentioned (C-3) used in the present invention is a vinyl monomer which is added for controlling the crosslinking reaction rate and is preferably a radical polymerizable vinyl monomer, and examples thereof are aromatic vinyl monomers, unsaturated nitrile monomers such as acrylonitrile and methacrylonitrile, acrylic ester monomers, methacrylic ester monomers, acrylic acid monomers, methacrylic acid monomers, maleic anhydride monomers and N-substituted maleimide monomers.

The (C-3) is used in an amount of preferably 1–80% by weight, more preferably 10–50% by weight in the crosslinking agent (C). If the amount is less than 1% by weight, crosslinking is insufficient and if it exceeds 80% by weight, mechanical strength lowers.

In the present invention, a softening agent (D) can be optionally added to improve processability of the elastomer composition.

The softening agent (D) is preferably a process oil such as paraffinic or naphthenic process oil. The softening agent is added in an amount of 5–500 parts by weight, preferably 10–150 parts by weight based on 100 parts by weight of the composition comprising (A) and (B) to adjust the hardness and flexibility of the composition. If the amount is less than 5 parts by weight, flexibility and processability are insufficient and if it exceeds 500 parts by weight, bleeding of the oil occurs conspicuously and this is not desired.

In the present invention, if necessary, thermoplastic resins other than (B) can be added. For example, there may be used one or more of polystyrene resins, polyphenylene ether resins, polyolefin resins, polyvinyl chloride resins, polyamide resins, polyester resins, polyphenylene sulfide resins, polycarbonate resins and polymethacrylate resins. Olefin resins are especially preferred as the thermoplastic resins.

The olefin resins which are preferred as the thermoplastic resins are preferably crosslinking type olefin resins, such as high-density, low-density and straight chain low-density polyethylenes, and ultra-high molecular weight polyethylenes. By using the crosslinking type olefin resins, the olefin resins are also partially crosslinked in the dynamic crosslinking to increase melt viscosity and improve melt processability such as vacuum moldability. It is not preferred from the viewpoint of melt processability to use decomposition type olefin resins as the above thermoplastic resins.

Moreover, the composition of the present invention can contain inorganic fillers and plasticizers in such an amount as not damaging the characteristics of the composition. The inorganic fillers used here include, for example, calcium carbonate, magnesium carbonate, silica, carbon black, glass fiber, titanium oxide, clay, mica, talc, magnesium hydroxide, and aluminum hydroxide. The plasticizers include, for example, polyethylene glycol, and phthalic esters such as dioctyl phthalate (DOP). Furthermore, there may be suitably used other additives such as, for example, organic and inorganic pigments, heat stabilizers, antioxidants, ultraviolet absorbers, light stabilizers, flame retardants, silicone oils, anti-blocking agents, foaming agents, antistatic agents and anti-fungus agents.

For the production of the composition of the present invention, there may be employed general apparatuses used for production of usual resin compositions and elastomer compositions, such as Banbury mixer, kneader, single-screw extruder and twin-screw extruder. For efficiently attaining the dynamic crosslinking, the twin-screw extruder is preferred. The twin-screw extruder is more suitable for continuous production of the composition of the present invention by uniformly and finely dispersing (A) and (B) and further adding other components to allow the crosslinking reaction to take place.

The composition of the present invention can be produced through the following processing steps as suitable examples. That is, (A) and (B) are well mixed and introduced into a hopper of an extruder. The crosslinking agent may be added from the first together with (A) and (B) or may be added at an intermediate position of the extruder. Moreover, (D) may be added at an intermediate position of the extruder or may be divided and separately added from the first and at an intermediate position. A part of (A) and (B) may be added at an intermediate position of the extruder. At the time of melt kneading by heating and melting in the extruder, a crosslinking reaction of (A) with the crosslinking agent takes place, and, furthermore, (D) and others are added and melt kneaded thereby attaining sufficient crosslinking reaction and kneading dispersion, and thereafter the product is taken out from the extruder to obtain pellets of the composition of the present invention.

Furthermore, as an especially preferred melt extrusion method, a twin-screw extruder is used which has a length L in the die direction starting from the starting material adding portion and has an L/D of 5–100 (D: diameter of barrel). It is preferred that the twin-screw extruder has a plurality of feed portions of a main feed portion and a side feed portion which differ in distance from the tip portion and has kneading parts between a plurality of the feed portions and between the tip portion and the feed portion nearer from the tip portion, and the length of each kneading part is 3D–10D.

The twin-screw extruder which is one of the apparatuses for production used in the present invention may be a twin-screw extruder of same direction-revolving type or a twin-screw extruder of different direction-revolving type. The intermeshing of the screws may be any of non-intermeshing type, partial intermeshing type and complete intermeshing type. When a uniform resin is to be obtained at a low temperature under application of a low shearing force, a different direction-revolving and partial intermeshing type screw is preferred. When a somewhat strong kneading is required, a same direction-revolving and complete intermeshing type screw is preferred. When a further stronger kneading is required, a same direction-revolving and complete intermeshing type screw is preferred.

In order to improve especially appearance and mechanical strength in the present invention, morphology of the composition comprising the crosslinkable rubber-like polymer (A) and the polypropylene resin (B) is also important and it is necessary that the crosslinkable rubber-like polymer (A) is present as discrete particles and the polypropylene resin (B) is in the form of continuous phase. For attaining the above morphology, for example, it is important to apply a high shearing force and control the crosslinking rate. Specifically, it can be attained by reducing the amount of the crosslinking initiator or the crosslinking aid and carrying out the reaction for a long time at a low temperature which is as low as possible, but higher than the decomposition temperature of the crosslinking initiator. Moreover, it can also be attained by using the polyfunctional monomer and the monofunctional monomer in combination as crosslinking aids. Addition of the crosslinking initiator or the crosslinking aid in too large amount, use of the excessively highly active crosslinking initiator or crosslinking aid, or use of high-temperature reaction condition causes agglomeration of the rubber-like polymer and the requirements of the present invention are not satisfied. When the crosslinking initiator and the crosslinking aid are added to (A) with previously absorbing a small amount of the softening agent (D) into (A), the crosslinking reaction proceeds gently and thus small and uniform particles can be produced.

As the production method for attaining excellent appearance and improvement of mechanical strength, it is more preferred to satisfy the following kneading degree M.

$$M=(\pi^2/2)(L/D)D^3(N/Q)$$

$$10 \times 10^6 \leq M \leq 1000 \times 10^6$$

In the above formulas, L denotes a length (mm) of the extruder in the die direction starting from a starting material adding portion, D denotes an inner diameter (mm) of a barrel of the extruder, Q denotes a discharge amount (kg/h), and N denotes the number of revolution of the screw (rpm).

It is important that the kneading degree $M=(\pi^2/2)(L/D)D^3(N/Q)$ satisfies $10 \times 10^6 \leq M \leq 1000 \times 10^6$. If M is less than $10 \times 10^6$, rubber particles become large and aggregate to cause deterioration of appearance, and if M exceeds $1000 \times 10^6$, due to the excess shearing force, mechanical strength lowers.

In order to attain the further better appearance and the higher mechanical strength, it is preferred that the melting temperatures satisfy the following relationships.

$T_1$: A temperature (° C.) such that (C-1) decomposes and then is reduced by half during one minute.

$$T_1-100<T_2<T_1+40$$

$$T_2+1<T_3<T_2+200$$

That is, melt kneading is first carried out at the melting temperature $T_2$ (° C.), and, then, melt kneading is carried out at the melting temperature $T_3$ (° C.). Especially, in a melt extruder having a length L starting from the starting material addition opening in the die direction, the melt kneading is first carried out in a zone of the extruder of 0.1L–0.5L in length from the starting material addition opening at the melting temperature $T_2$ (° C.), and, then, melt kneading is carried out in the subsequent zone of the extruder at the melting temperature $T_3$ (° C.).

Here, it is especially preferred that $T_1$ is 150–250° C., and $T_1$ or $T_2$ in each zone of the melt extruder may be a uniform temperature or may have a temperature gradient.

The thus obtained rubber composition can be made into various molded articles by optional molding methods. Preferred are injection molding, extrusion molding, compression molding, blow molding, calendering and expansion molding.

The elastomer composition of the present invention has excellent appearance, flexibility (feel), mechanical strength and melt processability.

The composition of the present invention can be used for a wide variety of uses such as automobile parts, interior automobile trims, air bag covers, mechanical parts, electric parts, cables, hoses, belts, toys, miscellaneous goods, daily necessaries, construction materials, sheets, films and others. Thus, the present invention has a great role in industry.

DESCRIPTION OF PREFERRED EMBODIMENTS

The present invention will be explained in more detail by the following examples and comparative examples. They should not be construed as limiting the invention in any manner. In these examples and comparative examples, test methods employed for evaluation of various properties are shown below.

(1) Judgement on whether the polypropylene (B) is crosslinking type or decomposition type:

A composition comprising polyolefin resin/POX/DVB= 100/0.67/1.33 (weight ratio) was melt kneaded using a laboplast mill manufactured by Toyo Seiki Mfg. Co., Ltd. for 10 minutes under the conditions of a preset temperature of 200° C. and a number of revolution of 100 rpm. When the resin in pellet state is introduced into the laboplast mill, it becomes half-molten state and finally molten state with retaining no shape. The polypropylene resin having such a characteristic that a torque higher than a torque Mo present just when the resin becomes molten state is present after the resin is molten is defined to be crosslinking type, and, on the other hand, the polypropylene resin having such a characteristic that a torque of not higher than Mo is present after the resin is molten is defined to be decomposition type.

(2) Melting point and calorie in the peak of melting point:

These were measured by differential scanning calorimetry (DSC). Specifically, using a thermal analysis apparatus system WS002 manufactured by Mak Science Co., Ltd. of Japan, a sample of 10 mg was heated from room temperature at a rate of 10° C./min and, immediately after reaching 200° C., was cooled to ° C. at a rate of 10° C./min in a nitrogen stream. Then, the sample was heated from ° C. to 200° C. at a rate of 10° C./min, and the peak of melting point detected at this stage was defined to be melting point and calorie in the peak of melting point in the present invention.

Here, the melting point is a peak top temperature (° C.), and the calorie at the melting point (J/g) was calculated from the peak area surrounded by the curve which shows change of calorie in respect to the base line. The above curve includes both the broad curve and the sharp curve. Furthermore, the peak top temperature means a point at which a straight line drawn parallel to the base line intersects a tangential line with the curve which shows the change of calorie.

(3) Crosslinking degree, swelling degree:

Weight $W_0$ of (A) in the composition was previously measured, and then the composition was refluxed in 200 ml of xylene for 20 hours, the resulting solution was filtered by a filter and weight ($W_1$) of the swollen composition was measured. Then, the swollen composition was vacuum dried at 100° C., and then the weight ($W_2$) thereof was again measured. Thus, the crosslinking degree and the swelling degree were calculated in the following manner.

$$\text{Crosslinking degree}=(W_2/W_0)\times 100\ (\%)$$

$$\text{Swelling degree}=W_1/W_2$$

(4) Tensile break strength [kgf/cm$^2$]:

Evaluation was conducted on a T-die extruded sheet at 23° C. in accordance with JIS K6251.

(5) Tensile break elongation [%]:

Evaluation was conducted on a T-die extruded sheet at 23° C. in accordance with JIS K6251.

(6) Appearance:

Evaluation of appearance was conducted on the surface texture of a T-die extruded sheet by the following criteria.

⊚: Very good.

○: Good.

Δ: Good, but having some surface roughness.

×: Wholly rough with no gloss.

(7) Flexibility (feel):

Evaluation of flexibility was conducted on the surface texture of a T-die extruded sheet by the following criteria.

⊚: Very good in flexibility and feel.

○: Good.

Δ: Good, but having some hardness.

×: Wholly hard and inferior in feel.

(8) Melt processability:

Melt tension and melt elongation of a molten polymer were measured using CAPILLO GRAPH 1C 3A manufactured by Toyo Seiki Mfg. Co., Ltd. as a capillary meter.

Under the following conditions, take-off speed was changed, and the melt tension at each take-off speed was measured. In this case, the melt tension and the take-off speed at the occurrence of breakage were taken as indications of melt tension (g) and melt elongation (m/min), respectively.

Land length: 10 mm; Orifice diameter: 1 mm; Melting temperature: 200° C.; Crosshead speed: 50 mm/min (9) Vacuum moldability:

A sheet of 1 mm in thickness was allowed to contact with a rectangular parallelopiped mold having a square underside of 15 cm×15 cm and having a depth of 5 cm and heated by an infrared heater until the surface of the sheet reached 140° C., and then a molded product was made under vacuum. Mold duplicability and transferability of the resulting molded product were visually evaluated and shown by the following criteria.

⊚: Very good in duplicability and good in transferability.

○: Good.

Δ: Good, but somewhat inferior in duplicability and transferability of corner portions.

×: Bad.

(10) Analysis of conjugated diene rubber:

1) Hydrogenation degree (%):

This was measured by the following process using NMR.

First, polybutadiene rubber before subjected to hydrogenation was dissolved in heavy chloroform. Then, calculation was carried out by the following formula from integration intensities of proton ($=CH_2$) of 1,2-vinyl having a chemical shift of 4.7–5.2 ppm (signal C0) and vinyl proton ($=CH_2$) having a chemical shift of 5.2–5.8 ppm (signal D0) which were obtained using FT-NMR (270 mega manufactured by Nippon Denshi Co., Ltd.).

$$(v)=[0.5C0/\{0.5C0+0.5(D0-0.5C0)\}]\times 100$$

Next, polybutadiene rubber after subjected to partial hydrogenation was dissolved in heavy chloroform. Similarly, the hydrogenation degree was calculated by the following formula from integration intensities of proton of methyl group ($—CH_3$) of hydrogenated 1,2 linkage having a chemical shift of 0.6–1.0 ppm (signal A1), proton ($=CH_2$) of un-hydrogenated 1,2-vinyl having a chemical shift of 4.7–5.2 ppm (signal C1), and un-hydrogenated vinyl proton ($=CH—$) having a chemical shift of 5.2–5.8 ppm (signal D1) which were obtained using FT-NMR.

First, assuming $p=0.5C0/(0.5C1+A1/3)$, and $A11=pA1$, $C11=pC1$ and $D11=pD1$, the hydrogenation degree (b) of the 1,2-vinyl linkage portion:

$$(b)=[(A11/3)/\{A11/3+C11/2\}]\times 100,$$

the hydrogenation degree (c) of the 1,4-double bond portion:

$$(c)=[\{0.5(D0-0.5C0)-0.5(D11-0.5C11)\}/0.5(D0-0.5C0)]\times 100,$$

and the hydrogenation degree (a) of the whole butadiene portion:

$$(a)=(v)\times(b)/100 +[100-(v)]\times(c)\times 100.$$

2) Micro-structure:

The micro-structure is shown below using the symbols defined above.

1,2-vinyl linkage before hydrogenation=$(v)\times(b)/100(\%)$ 1,4-linkage before hydrogenation=$\{100-(v)\}\times(c)/100(\%)$ 1,2-vinyl linkage after hydrogenation=$(v)\times(100-(b))/100(\%)$ 1,4-vinyl linkage after hydrogenation=$\{100-(v)\}\times\{100-(b)\}1/100(\%)$ (11) Light stability:

The test was conducted in accordance with JIS K7102 using ATLAS C135W Weatherometer manufactured by ATLAS Electric Devices Co., Ltd. (U.S.A.) as a light stability tester. Irradiation conditions were as follows. Internal temperature of the tester: 55° C.; humidity: 55%; no rain; and irradiation for 300 hours with xenon light (wavelength: 340 nm; energy: 0.30 W/m$^2$). After the irradiation, appearance of the sheet was visually evaluated and graded by the following criteria.

⊚: Very good.

○: Good.

Δ: Good, but having some surface roughness.

×: Wholly rough with no gloss.

The following components were used in the examples and the comparative examples.

(a) Crosslinkable rubber-like polymer (A):

(1) A copolymer of ethylene and octene-1 (referred to as "TPE-1").

This was prepared by the process using a metallocene catalyst as disclosed in JP-A-3-163088. The copolymer had a compositional ratio of ethylene/octene-1 of 72/28 (weight ratio).

(2) A copolymer of ethylene and octene-1 (referred to as "TPE-2").

This was prepared by the process using a usual Ziegler catalyst. The copolymer had a compositional ratio of ethylene/octene-1 of 72/28 (weight ratio).

(3) An ethylene-propylene-dicyclopentadiene copolymer (referred to as "TPE-3").

This was prepared by the process using a metallocene catalyst as disclosed in JP-A-3-163088. The copolymer had a compositional ratio of ethylene/propylene/dicyclopentadiene of 72/24/4 (weight ratio).

(4) A styrene-ethylene-butylene-styrene copolymer manufactured by Asahi Kasei Kogyo K.K. [trademark: Tuftech](referred to as "SEBS").

(5) A styrene-butadiene copolymer manufactured by Asahi Kasei Kogyo K.K. [trademark: Tufprene](referred to as "SB").

(6) Polybutadiene rubber having a hydrogenation degree of 0–100% (hydrogenated rubber).

(b) Polyolefin resin:

(1) Ethylene-propylene random copolymer resin.

Random copolymer resins differing in copolymeric composition, flexural modulus, melting point and calorie at melting point were prepared in accordance with EP 0969043 A1 or U.S. Pat. 5,198,401 using a Ziegler catalyst with changing ratio of ethylene and propylene and polymerization conditions. For comparison, random copolymer resins were similarly prepared using a metallocene catalyst.

(2) Homopolypropylene

Isotactic homopolypropylene manufactured by Japan Polyolefin Co., Ltd. [flexural modulus: 18000 kgf/cm$^2$; melting point according to DSC method: 162° C.; calorie at melting point: 81 J/g] (referred to as "PP(3")

(3) Block polypropylene

Block polypropylene manufactured by Japan Polyolefin Co., Ltd. [flexural modulus: 12000 kgf/cm$^2$; melting point according to DSC method: 163° C.; calorie at melting point: 67 J/g] (referred to as "PP-2").

(4) Low-density polyethylene

SUNTEC LD manufactured by Asahi Kasei Kogyo K.K. [flexural modulus: 5500 kgf/cm$^2$; endothermic peak according to DSC method: 128° C.; endothermic peak calorie: 230 J/g] (referred to as "LDPE").

(c) Crosslinking agent (C):

(1) Crosslinking initiator (C-1)

2,5-Dimethyl-2,5-bis(t-butylperoxy)hexane manufactured by Nippon Oil & Fats Co., Ltd. [trademark: PERHEXA 25B] (referred to as "POX-1").

(2) Crosslinking initiator (C-1)

2,5-Dimethyl-2,5-bis(t-butylperoxy)hexyne-3 manufactured by Nippon Oil & Fats Co., Ltd. [trademark: PERHEXYNE 25B] (referred to as "POX-2").

(3) Polyfunctional monomer (C-2)

Divinylbenzene manufactured by Wako Junyaku Co., Ltd. (referred to as "DVB").

(4) Polyfunctional monomer (C-2)

Triallyl isocyanurate manufactured by Nippon Kasei Co., Ltd. (referred to as "TAIC").

(5) Polyfunctional monomer (C-2)

N,N-m-phenylenebismaleimide manufactured by Ouchi Shinkou Kagaku Co., Ltd. (referred to as "PMI").

(6) Monofunctional monomer (C-3)

Methyl methacrylate manufactured by Asahi Kasei Kogyo K.K. (referred to as "MMA").

(d) Paraffin oil (D):

DIANA Process Oil PW-90 manufactured by Idemitsu Kosan Co., Ltd. (referred to as "MO").

EXAMPLES 1–21

Comparative Examples 1–8

A twin-screw extruder (40 mm φ, L/D=47) having a feed opening at the central part of the barrel was used as an extruder. A two-start screw having kneading portions before and after the feed opening was used as a screw.

Each of the compositions shown in Tables 1 and 2 was melt extruded under the following melting conditions as standard conditions. When MO was used, this was fed from the feed opening provided at the central part of the extruder by a pump and melt extruded. The crosslinking degree was nearly 60% and the swelling degree was nearly 15 in all cases. In Example 20, two-stage melt extrusion was carried out. First, (A)/PP-1/(C)/(D) was melt kneaded and pelletized, then the resulting pellets were mixed with polypropylene resin (B), and the mixture was again melt extruded.

A sheet of 2 mm thick was made from the thus obtained composition at 200° C. using a T-die extruder and was evaluated on various properties. The results are shown in Tables 1 and 2.

(Standard melting conditions):

1) Melt extruding temperature: 220° C. (constant)
2) Discharge amount Q=12 kg/h
3) Extruder: Inner diameter of barrel D=25 mm
4) L/D=47 when length of the extruder is L (mm).
5) The number of revolution of screw N=280 rpm According to Tables 1 and 2, it can be seen that elastomer compositions excellent in appearance, flexibility (feel), mechanical strength and melt processability can be obtained by using polypropylene resins which satisfied the requirements of the present invention.

Further, it can be seen that melt processability and vacuum moldability were markedly improved by reacting the crosslinking agent and the crosslinking type polypropylene at one stage than by the two-stage extrusion method because polypropylene of the matrix was partially crosslinked in the former one stage method.

In the case of using a decomposition type polypropylene as a thermoplastic resin usable in combination with the crosslinking type polypropylene, the decomposition type polypropylene cannot be said to be especially preferred resin from the point of melt processability. This is because there is the possibility of the decomposition type polypropylene restraining the crosslinking reaction of the crosslinking type polypropylene. As the usable thermoplastic resins, polyethylene is preferred and is useful for the improvement of melt processability.

Further excellent melt processability can also be obtained by using two crosslinkable rubber-like polymers.

EXAMPLES 22–35

The same experiments as in Example 3 were repeated, except that the ratio (A)/(B) was changed to 60/40 and the hydrogenated rubber, TPE-2 and TPE-3 were used as (A). The results are shown in Table 3.

According to Table 3, it can be seen that the resulting samples were excellent in tensile break strength, appearance, flexibility, light stability and melt processability in the case of using an ethylene-α-olefin copolymer comprising ethylene prepared using a metallocene catalyst and an α-olefin of 3–20 carbon atoms and/or a homopolymer having double bonds in the main chain and the side chain and/or a hydrogenated rubber obtained by hydrogenating 50% or more of total double bonds of an unsaturated rubber comprising a random copolymer.

EXAMPLES 36–45

The same experiments as in Example 3 were repeated, except that the ratio (A)/(B) was changed to 70/30, the melt kneading was first carried out at the melting temperature $T_2$ (° C.), and, then, the melt kneading was carried out at the melting temperature $T_3$ (° C.) in accordance with the following definitions, and (C-2) and (C-3) mentioned in Table 4 were used in place of DVB. The results are shown in Table 4. In the case of using (C-2) and (C-3) in combination, these were used in an equal amount.

According to Table 4, it can be seen that tensile break strength, appearance, flexibility and melt processability were improved by performing the production under the following melting conditions.

$T_1$: A temperature (° C.) such that (C-1) decomposes and then is reduced by half during one minute.

$$T_1-100<T_2<T_1+40$$

$$T_2+1<T_3<T_2+200$$

EXAMPLES 46–48

The same experiments as in Example 3 were repeated, except that the kneading degree M was changed in accordance with the following definition. The results are shown in Table 5.

$$M=(\pi^2/2)(L/D)D^3(N/Q)$$

In the above formula, L denotes a length (mm) of an extruder in the die direction starting from a starting material adding portion, D denotes an inner diameter (mm) of a barrel of the extruder, Q denotes a discharge amount (kg/h), and N denotes the number of revolution of screw (rpm), in which D was 25 mm and L/D was 47.

According to Table 5, it can be seen that tensile break strength, appearance, flexibility and melt processability were improved by performing the production with the kneading degree M in the range of $10 \times 10^6 \leq M \leq 1000 \times 10^6$.

EXAMPLES 49–54

Comparative Example 9

The same experiments as in Example 3 were carried out, except that the crosslinking degree and the swelling degree were changed by the kind and amount of the crosslinking agent and the reaction temperature taking the conditions of Example 3 as standards. The results are shown in Table 6. According to Table 6, it can be seen that when the crosslinking degree of (A) was 1–95%, preferably 1–60 and the swelling degree was 3–100, preferably 10–100, very excellent melt processability was developed.

TABLE 1

|  | Composition |  | Comparative Example 1 | Example 1 | Example 2 | Example 3 | Comparative Example 4 | Comparative Example 2 | Comparative Example 3 | Example 5 | Example 6 |
|---|---|---|---|---|---|---|---|---|---|---|---|
| Weight ratio | (A) |  | 65 TPE-1 | | | | | | | | |
|  | (B) Crosslinking type | | Ziegler | | | | | | | | |
|  | Catalyst | | | | | | | | | | |
|  | Amount | | 35 | | | | | | | | |
|  | Fm (kg/cm²) | | 50 | 100 | 1000 | 6000 | 10000 | 12000 | 6000 | 6050 | 6050 |
|  | Tm (° C.) | | 135 | 134 | 135 | 136 | 135 | 134 | 90 | 100 | 150 |
|  | ΔH (J/g) | | 62 | 63 | 62 | 63 | 65 | 60 | 63 | 62 | 63 |
|  | Decomposition type polypropylene | | | | | | | | | | |
|  | (C) POX-1 | | | | | | 0.5 | | | | |
|  | DVB | | | | | | 1.0 | | | | |
|  | (D) MO | | | | | | 0 | | | | |
| Tensile break strength Tb (MPa) | | | 2 | 7 | 9 | 11 | 13 | 11 | 3 | 8 | 12 |
| Tensile break elongation (%) | | | 50 | 350 | 450 | 550 | 590 | 560 | 600 | 630 | 500 |
| Appearance | | | × | ○ | ⊚ | ⊚ | ○ | × | ○ | ⊚ | ○ |
| Flexibility | | | ⊚ | ○ | ○ | ○ | ○ | × | ○ | ⊚ | ○ |
| Melt tension (g) | | | 0.1 | 1.9 | 2.3 | 2.7 | 3.0 | 0.8 | 0.5 | 1.9 | 2.9 |
| Melt elongation (m/min) | | | 1 | 38 | 45 | 50 | 40 | 5 | 7 | 40 | 35 |
| Vacuum moldability | | | × | ○ | ⊚ | ⊚ | ○ | × | × | ○ | ○ |

|  | | | Comparative Example 4 | Example 5 | Example 7 | Example 8 | Example 9 | Example 10 | Comparative Example 6 | Example 11 |
|---|---|---|---|---|---|---|---|---|---|---|
| Weight ratio | (A) | | 65 TPE-1 | | | | | | | |
|  | (B) Crosslinking type | | Ziegler | | | | | | | Metallocene |
|  | Catalyst | | | | | | | | | |
|  | Amount | | 35 | | | | | | | |
|  | Fm (kg/cm²) | | 6000 | 6000 | 6050 | 6000 | 6100 | 6050 | 6000 | 6000 |
|  | Tm (° C.) | | 160 | 135 | 134 | 136 | 135 | 134 | 136 | 135 |
|  | ΔH (J/g) | | 62 | 8 | 10 | 100 | 300 | 600 | 650 | 62 |
|  | Decomposition type polypropylene | | | | | | | | | |
|  | (C) POX-1 | | | | | | 0.5 | | | |
|  | DVB | | | | | | 1.0 | | | |
|  | (D) MO | | | | | | 0 | | | |
| Tensile break strength Tb (Mpa) | | | 11 | 3 | 9 | 12 | 13 | 15 | 7 | 13 |
| Tensile break elongation (%) | | | 400 | 550 | 600 | 580 | 590 | 620 | 70 | 650 |
| Appearance | | | × | ○ | ⊚ | ⊚ | ⊚ | ○ | × | ⊚ |
| Flexibility | | | × | ○ | ⊚ | ○ | ○ | ○ | × | ⊚ |
| Melt tension (g) | | | 0.9 | 0.3 | 2.0 | 3.0 | 2.9 | 3.0 | 0.5 | 3.1 |
| Melt elongation (m/min) | | | 9 | 5 | 45 | 48 | 50 | 45 | 7 | 60 |
| Vacuum moldability | | | × | × | ○ | ⊚ | ⊚ | ○ | × | ⊚ |

Fm: Flexural modulus (kg/cm²)
Tm; Melting point (° C.)
ΔH: Calorie in peak of melting point (J/g)

TABLE 2

|  | Composition | | Example 12 | Example 13 | Example 14 | Example 15 | Example 16 | Example 17 | Example 18 |
|---|---|---|---|---|---|---|---|---|---|
| Weight ratio | (A) | | 50 TPE-1 | | | 50 TPE-2 | 50 TPE-3 | 50 SEBS | |
|  | (B) Crosslinking type | | Ziegler | | | | | | |
|  | Catalyst | | | | | | | | |
|  | Amount | | 50 | | | | | | |
|  | Fm (kg/cm²) | | 6500 | | | | | | |
|  | Tm (° C.) | | 135 | | | | | | |
|  | ΔH (J/g) | | 65 | | | | | | |
|  | Other thermoplastic resin | | 0 | 50 PP-1 | 50 PP-2 | 50 LDPE | | 0 | |
|  | (C) POX-1 | | 0.5 | | | | | | |
|  | DVB | | 1.0 | | | | | | |
|  | (D) MO | | 20 | | | | | | |
| Tensile break strength Tb (MPa) | | | 11 | 12 | 13 | 10 | 8 | 7.5 | 35 |
| Tensile break strength (%) | | | 530 | 580 | 590 | 580 | 350 | 300 | 800 |

TABLE 2-continued

|  |  |  |  |  |  |  |  |
|---|---|---|---|---|---|---|---|
| Appearance | ◎ | ◎ | ◎ | ◎ | Δ | Δ | ◎ |
| Flexibility | ○ | ○ | ○ | ○ | Δ | Δ | ◎ |
| Melt tension (g) | 2.8 | 1.1 | 1.2 | 3.5 | 2.0 | 1.5 | 2.7 |
| Melt elongation (m/min) | 49 | 21 | 25 | 63 | 38 | 35 | 58 |
| Vacuum moldability | ◎ | Δ | Δ | ◎ | Δ | Δ | ◎ |

|  |  |  | Example | | Comparative Example | | Example | |
|---|---|---|---|---|---|---|---|---|
|  | Composition | | 19 | 20* | 7 | 8 | 21 | |
| Weight ratio | (A) | | 50 | 50 | | 50 | 25 | 25 |
|  |  | | SB | TPE-1 |  |  | TPE-1 | TPE-3 |
|  | (B) | Crosslinking type |  |  | | Ziegler |  |  |
|  |  | Catalyst |  |  |  |  |  |  |
|  |  | Amount | 50 | 50 | 50 | 50 | 50 | |
|  |  |  |  | PP-1 | PP-1 | PP-2 |  |  |
|  |  | Fm (kg/cm²) | 6500 | 18000 | 18000 | 12000 | 6500 | |
|  |  | Tm (° C.) | 135 | 162 | 162 | 163 | 135 | |
|  |  | ΔH (J/g) | 65 | 81 | 81 | 67 | 65 | |
|  | Other thermoplastic | | 0 | 50 | 0 | | 0 | |
|  | resin | |  | PP-1 |  |  |  |  |
|  | (C) | POX-1 |  |  |  | 0.5 |  |  |
|  |  | DVB |  |  |  | 1.0 |  |  |
|  | (D) | MO |  |  |  | 20 |  |  |
| Tensile break strength Tb (MPa) | | | 23 | 10 | 10 | 8 | 14 | |
| Tensile break strength (%) | | | 700 | 500 | 480 | 300 | 630 | |
| Appearance | | | ◎ | ○ | × | × | ◎ | |
| Flexibility | | | ◎ | ○ | × | × | ◎ | |
| Melt tension (g) | | | 2.5 | 0.7 | 0.3 | 0.2 | 3.2 | |
| Melt elongation (m/min) | | | 51 | 18 | 5 | 6 | 58 | |
| Vacuum moldability | | | ◎ | Δ | × | × | ◎ | |

Fm: Flexural modulus (kg/cm²)
Tm: Melting point (° C.)
ΔH: Calorie in peak of melting point (J/g)
*2: Two stage melt extrusion which comprises first melt extruding (A)/PP-1/(C)/(D), then adding (B) to the resulting product and again carrying out melt extusion.

TABLE 3

|  |  |  | Example | | | | | | |
|---|---|---|---|---|---|---|---|---|---|
|  |  |  | 22 | 23 | 24 | 25 | 26 | 27 | 28 |
| Component (A) | Kind | | Hydrogenated rubber | | | | | | |
|  | Hydrogenation degree (%) | | 50 | 85 | 90 | 95 | 100 | 0 | 45 |
|  | Amount of remaining double bonds in main chain (%)* | | 44 | 11 | 8 | 4.5 | 0 | 85 | 37 |
|  | Amount of remaining double bonds in side chain (%)** | | 6 | 4 | 2 | 0.5 | 0 | 15 | 8 |
|  | Composition before hydrogenation BD/ST*** | | 100/0 | 100/0 | 100/0 | 100/0 | 100/0 | 100/0 | 100/0 |
| Tensile break strength (MPa) | | | 10.0 | 11.5 | 12.0 | 12.0 | 13.0 | 9.5 | 9.0 |
| Appearance | | | ○ | ○ | ◎ | ◎ | ◎ | ○ | ○ |
| Flexibility | | | ◎ | ◎ | ◎ | ◎ | ◎ | ○ | ○ |
| Light stability | | | Δ | ○ | ◎ | ◎ | ◎ | Δ | Δ |
| Melt tension (g) | | | 1.8 | 2.0 | 2.1 | 2.2 | 2.6 | 1.3 | 1.4 |
| Melt elongation (m/min) | | | 40 | 43 | 45 | 49 | 51 | 35 | 36 |
| Vacuum moldability | | | Δ | ○ | ○ | ◎ | ◎ | Δ | Δ |

|  |  | Example | | | | | |
|---|---|---|---|---|---|---|---|
|  |  | 29 | 30 | 31 | 32 | 33 | 34 | 35 |
| Component (A) | Kind | TPE-1 | TPE-2 | TPE-3 | Hydrogenated rubber | | | |
|  | Hydrogenation degree (%) | | | | 50 | 85 | 95 | 50 |
|  | Amount of remaining double bonds in main chain (%)* | | | | 44 | 11 | 4.5 | 44 |
|  | Amount of remaining double bonds in side chain (%)** | | | | 6 | 4 | 0.5 | 6 |

TABLE 3-continued

| | | | | | | | |
|---|---|---|---|---|---|---|---|
| Composition before hydrogenation BD/ST*** | | | | 80/20 | 80/20 | 80/20 | 90/10 |
| Tensile break strength (MPa) | 15.0 | 10.5 | 9.0 | 11.0 | 12.5 | 13.1 | 10.5 |
| Appearance | ⊚ | ⊚ | ⊚ | ⊚ | ⊚ | ⊚ | ⊚ |
| Flexibility | ⊚ | ⊚ | ⊚ | ⊚ | ⊚ | ⊚ | ⊚ |
| Light stability | ⊚ | ⊚ | Δ | ○ | ⊚ | ⊚ | Δ–○ |
| Melt tension (g) | 2.7 | 2.1 | 1.7 | 2.0 | 2.2 | 2.5 | 2.3 |
| Melt elongation (m/min) | 53 | 39 | 34 | 41 | 42 | 51 | 50 |
| Vacuum moldability | ⊚ | Δ | Δ | ○ | ⊚ | ⊚ | ⊚ |

*Amount of 1,4 linkage
**Amount of 1,2-vinyl linkage
***BD: Polybutadiene, ST: Styrene

TABLE 4

| | Example | | | | | | | | | |
|---|---|---|---|---|---|---|---|---|---|---|
| | 36 | 37 | 38 | 39 | 40 | 41 | 42 | 43 | 44 | 45 |
| Kind of (C-1) | POX-1 | POX-1 | POX-1 | POX-1 | POX-1 | POX-2 | | | POX-1 | |
| $T_1$ | 180 | 180 | 180 | 180 | 180 | 194 | | | 180 | |
| $T_2$ | 150 | 85 | 215 | 150 | 150 | 150 | | | 150 | |
| $T_3$ | 220 | 220 | 220 | 155 | 345 | 220 | | | 220 | |
| (C-2) | | | DVB | | | | TAIC | PMI | — | TAIC |
| (C-3) | | | | | | | — | — | MMA | MMA |
| Tensile break strength (MPa) | 13.5 | 12.0 | 11.5 | 11.0 | 10.5 | 13.0 | 11.5 | 11.0 | 9.0 | 13.0 |
| Appearance | ⊚ | ⊚ | ○ | ⊚ | ○ | ○ | ○ | ○ | ⊚ | ⊚ |
| Flexibility | ⊚ | ⊚ | ⊚ | ⊚ | ⊚ | ⊚ | ⊚ | ⊚ | ⊚ | ⊚ |
| Melt tension (g) | 2.6 | 2.0 | 1.9 | 2.8 | 1.8 | 2.8 | 3.1 | 2.9 | 1.5 | 2.8 |
| Melt elongation (m/min) | 50 | 45 | 46 | 52 | 40 | 52 | 58 | 59 | 25 | 58 |
| Vacuum moldability | ⊚ | ○ | ○ | ⊚ | Δ | ⊚ | ⊚ | ⊚ | Δ | ⊚ |

In the case of POX-1: $T_1 = 180$  $80 < T_2 < 220$  $T_2 + 1 < T_3 < T_2 + 200$
In the case of POX-2: $T_1 = 194$  $94 < T_2 < 234$  $T_2 + 1 < T_3 < T_2 + 200$

TABLE 5

| | Example | | |
|---|---|---|---|
| | 46 | 47 | 48 |
| Production condition | | | |
| N | 300 | 300 | 2750 |
| Q | 10 | 100 | 10 |
| M (× 10⁵) | 109 | 11 | 997 |
| Tensile break strength (MPa) | 12.0 | 11.0 | 10.0 |
| Appearance | ⊚ | ○ | ⊚ |
| Flexibility | ⊚ | ○ | ⊚ |
| Melt tension (g) | 2.8 | 2.5 | 2.0 |
| Melt elongation (m/min) | 55 | 45 | 58 |
| Vacuum modability | ⊚ | ○ | ⊚ |

TALE 6

| | Example | | | | | | Comparative Example |
|---|---|---|---|---|---|---|---|
| | 49 | 50 | 51 | 52 | 53 | 54 | 9 |
| Crosslinking degree (%) | 60 | 1 | 30 | 80 | 95 | 100 | 0 |
| Swelling degree | 15 | 100 | 50 | 10 | 3 | 1 | 1000 |
| Tensile break strength Tb (MPa) | 12 | 8 | 10 | 14 | 16 | 17 | 2 |
| Tensile break elongation (%) | 590 | 780 | 570 | 480 | 450 | 380 | 500 |
| Appearance | ⊚ | ⊚ | ⊚ | ○ | ○ | Δ | ⊚ |
| Flexibility | ○ | ⊚ | ⊚ | ○ | ○ | Δ | ○ |

TALE 6-continued

|  | Example | | | | | | Comparative Example |
|---|---|---|---|---|---|---|---|
|  | 49 | 50 | 51 | 52 | 53 | 54 | 9 |
| Melt tension (g) | 2.8 | 1.5 | 2.5 | 2.7 | 2.6 | 1.8 | 0.1 |
| Melt elongation (m/min) | 52 | 19 | 55 | 45 | 40 | 20 | 2 |
| Vaccum moldability | ⊚ | Δ | ⊚ | ○ | ○ | Δ | × |

What is claimed is:

1. An elastomer composition obtained by crosslinking 1–99 parts by weight of a crosslinkable rubber polymer (A) and 1–99 parts by weight of a polypropylene resin (B) based on 100 parts by weight of the total amount of (A) and (B), where (B) is a crosslinkable polypropylene resin containing a random copolymer resin of propylene with an α-olefin of 2 or 4–20 carbon atoms, has a flexural modulus of 100–10000 kgf/cm$^2$ as specified in JIS K6758 and has a peak of melting point in the range of 100–150° C. in differential scanning calorimetry (DSC), wherein the calorie in the peak of melting point being in the range of 10–600 J/g.

2. An elastomer composition according to claim 1, wherein the crosslinkable rubber polymer (A) has a crosslinking degree of 1–95% and a swelling degree of 3–100.

3. An elastomer composition according to claim 1, wherein the crosslinkable rubber polymer (A) has a crosslinking degree of 1–60% and a swelling degree of 10–100.

4. An elastomer composition according to claim 1, wherein the crosslinkable rubber polymer (A) is a styrene thermoplastic rubber polymer and/or an olefin thermoplastic rubber polymer.

5. An elastomer composition according to claim 4, wherein the crosslinkable rubber polymer (A) is an ethylene-α-olefin copolymer comprising ethylene and an α-olefin of 3–20 carbon atoms.

6. An elastomer composition according to claim 5, wherein the crosslinkable rubber polymer (A) is an ethylene-α-olefin copolymer produced using a metallocene catalyst.

7. An elastomer composition according to claim 1, wherein the polypropylene resin (B) is a polypropylene random copolymer resin.

8. An elastomer composition according to claim 1 which is obtained by mixing the crosslinkable rubber polymer (A) and the polypropylene resin (B) and crosslinking the mixture with a crosslinking agent (C).

* * * * *